(No Model.)  4 Sheets—Sheet 1.
J. B. MAAS.
ROCK DRILL.
No. 343,466.  Patented June 8, 1886.
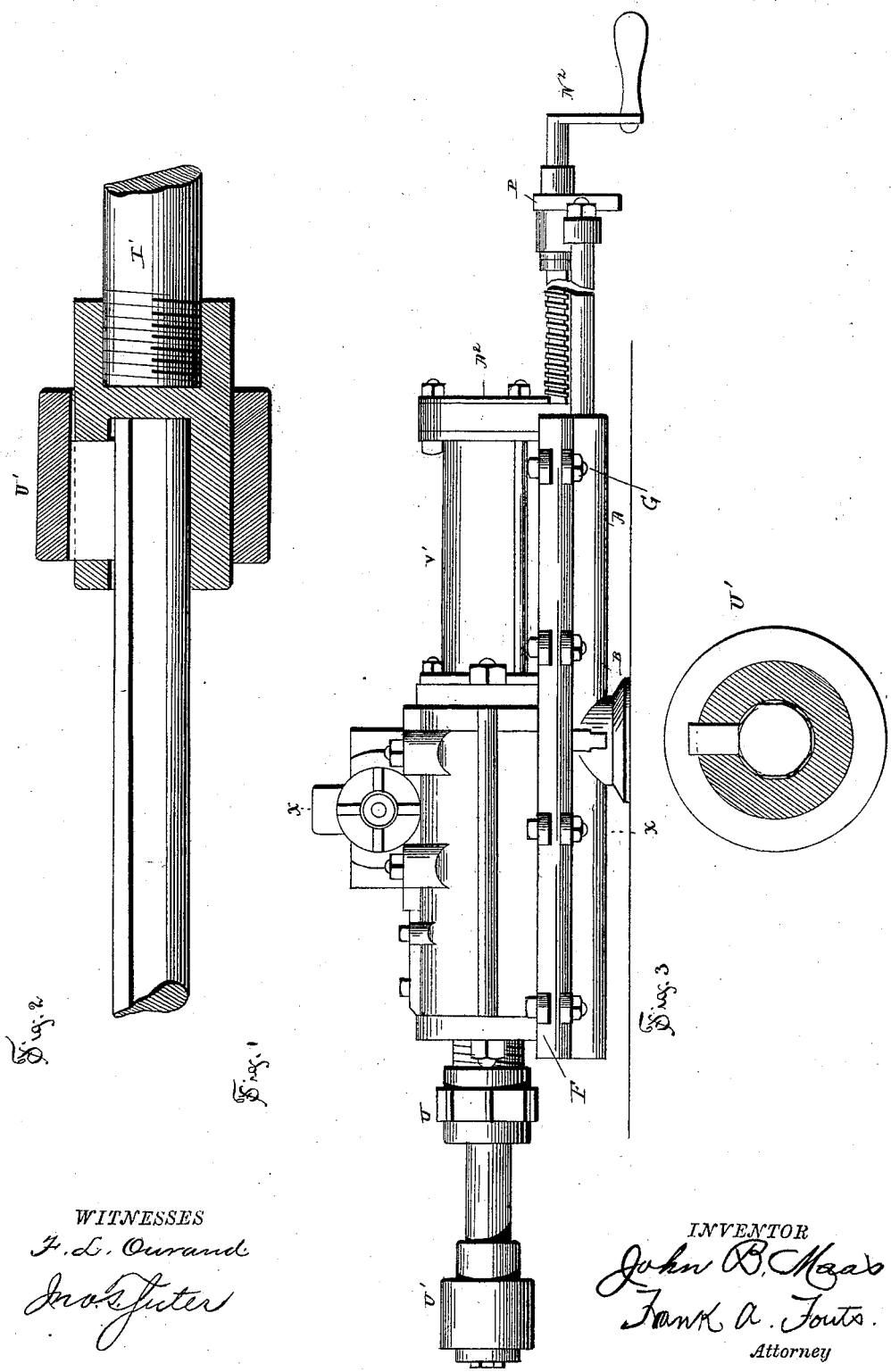
WITNESSES
F. L. Ourand
Jno. F. Juter
INVENTOR
John B. Maas
Frank A. Fouts.
Attorney

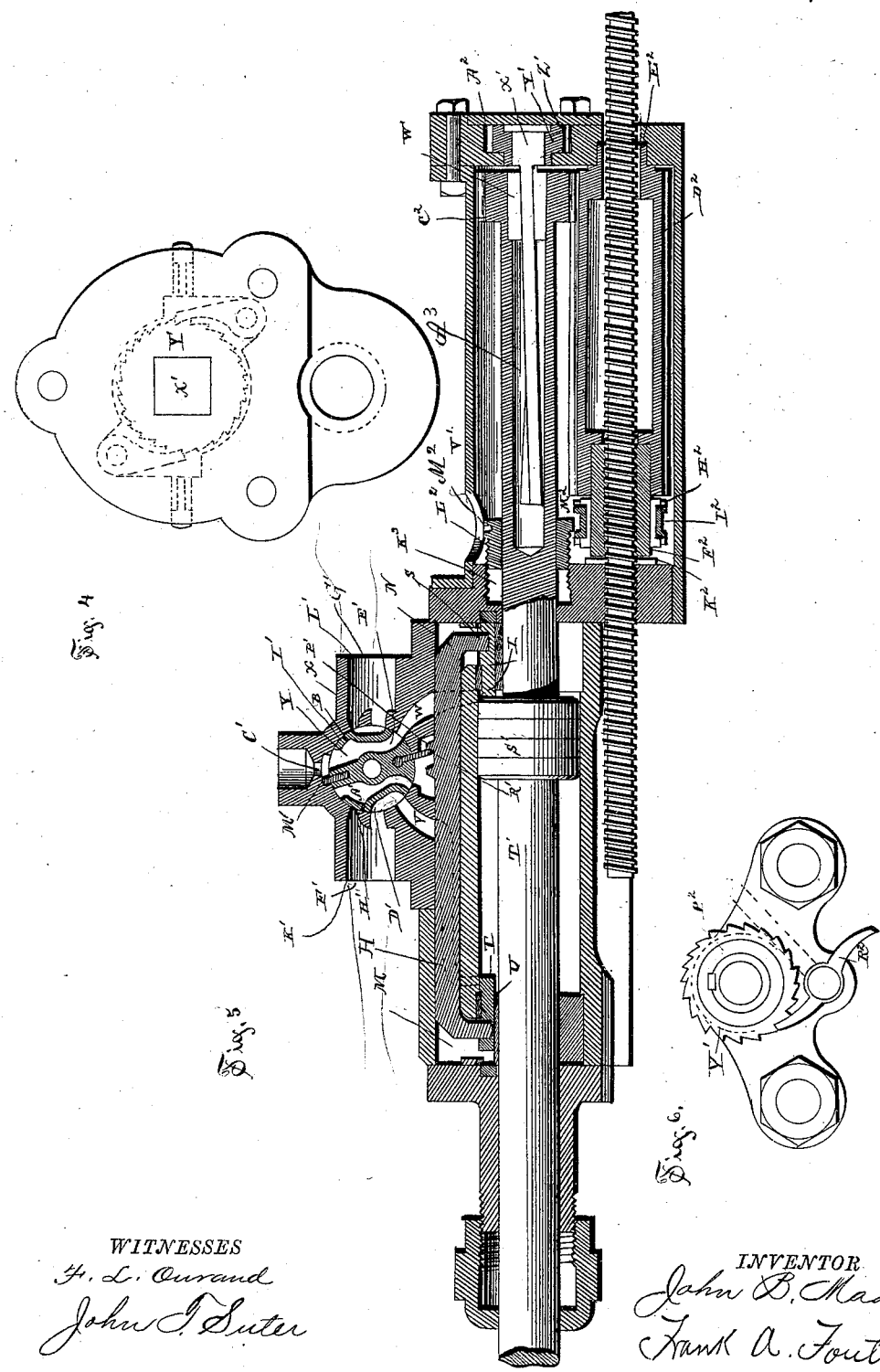

(No Model.) 4 Sheets—Sheet 3.
J. B. MAAS.
ROCK DRILL.
No. 343,466. Patented June 8, 1886.
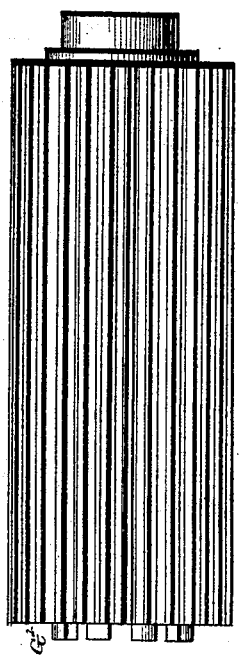
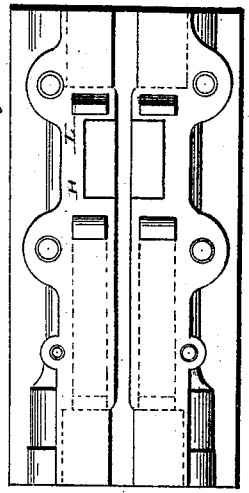
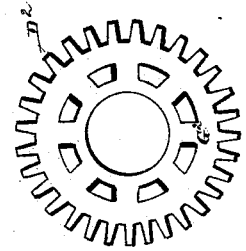
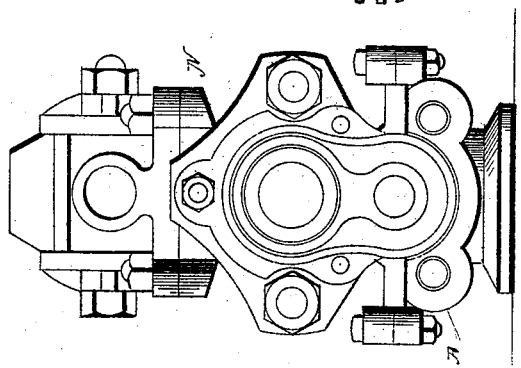
WITNESSES
*I. L. Ourand*
*Jno. T. Juter*
INVENTOR
*John B. Maas*
*Frank A. Fouts.*
Attorney
N. PETERS, Photo-Lithographer, Washington, D. C.

(No Model.) 4 Sheets—Sheet 4.
J. B. MAAS.
ROCK DRILL.
No. 343,466. Patented June 8, 1886.
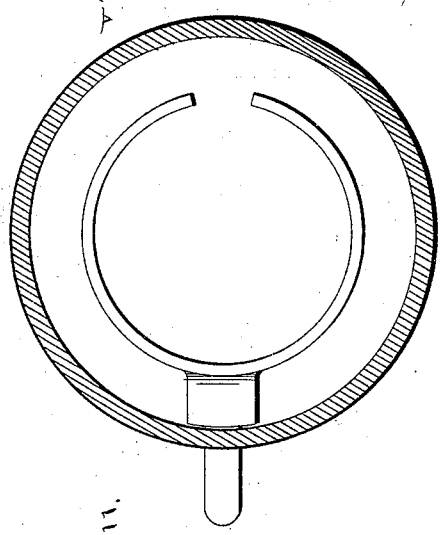
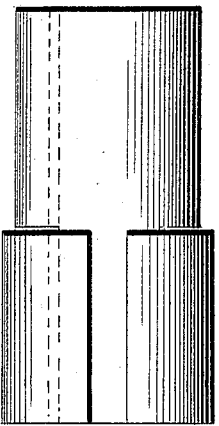
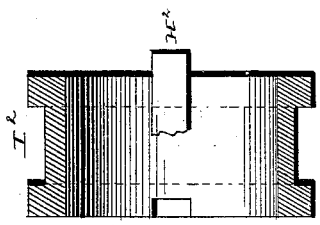
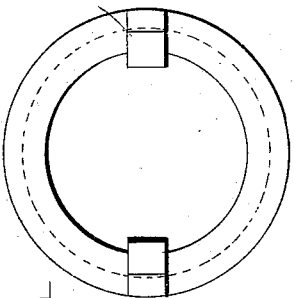
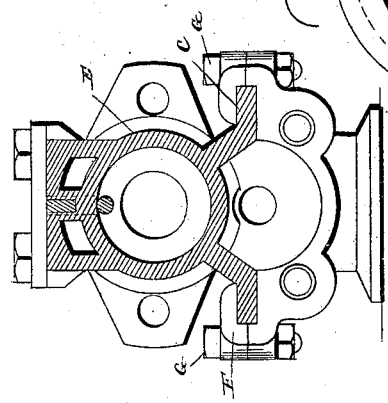
WITNESSES
F. L. Ourand
John T. Suter
INVENTOR
John B. Maas
Frank A. Fouts,
Attorney
N. PETERS, Photo-Lithographer, Washington, D. C.

UNITED STATES PATENT OFFICE.

JOHN B. MAAS, OF HUMBOLDT, MICHIGAN.

ROCK-DRILL.

SPECIFICATION forming part of Letters Patent No. 343,466, dated June 8, 1886.

Application filed December 31, 1885. Serial No. 187,234. (No model.)

*To all whom it may concern:*

Be it known that I, JOHN B. MAAS, a citizen of the United States, residing at Humboldt, in the county of Marquette, State of Michigan, have invented certain new and useful Improvements in Rock-Drills, of which the following is a specification, reference being had therein to the accompanying drawings.

This invention relates to certain improvements in rock-drills, and it has for its objects to provide a drill which may be operated by steam, as more fully hereinafter described; and the invention consists in the peculiar construction and arrangement of the parts, whereby a reciprocating piston is automatically driven and the drill-stock fed forward properly either automatically or by hand, as may be required. These objects are attained by the means illustrated in the accompanying drawings, in which—

Figure 1 represents a side elevation of the improved drill entire; Fig. 2 a detached view of the drill-chuck in section, showing a portion of the drill. Fig. 3 represents a cross-section of the drill-chuck; Fig. 4, a rear view of a portion of the machine, showing chuck, ratchet, and pawls in dotted lines; Fig. 5, a longitudinal sectional view of the drill; Fig. 6, a rear view of a portion of the machine, showing the ratchet and pawl for holding the feed-bar in one direction; Fig. 7, a face view of the valve-seat on the steam-cylinder; Fig. 8, a rear view of the drill entire; Fig. 9, a view in front and side elevation of the long pinion which operates the pinion giving motion to the feed-screws; Fig. 10, a transverse vertical section taken on the line $x\,x$ of Fig. 1. Fig. 11 views of the device for shifting the sleeve which connects the long pinion to the sleeve of the feed-screw, and Fig. 12 detached views of said sleeve and the nut surrounding the feed-screw.

In the drawings, Figs. 1, 8, and 10, the letter A indicates the bed of the machine which is provided with a suitable base, B, upon which it stands when in position. The base is provided with ways C, Fig. 10, at each side in which are adapted to slide the flanges D, formed at each side of the base of the cylinder E, to enable the cylinder with the drill and operating mechanism to be fed forward to the work to be done. The ways are formed by the clamped rabbeted sections F, which are secured upon similar rabbeted flanges at each side of the bed by means of suitable screwbolts, G. The said cylinder, at its upper side, is provided with ports H I near its opposite ends, which lead to the respective ends of the cylinder.

In the chamber M is located a reciprocating tappet-arm, N, which is provided at each end with extensions S, which set in recesses in the tappet-pins T, arranged to slide in ways U near each end of the cylinder. The steamchest is arranged to connect with the ports V W, leading from the said chest to a valve-chest, X, above, in which is located an oscillating cylindrical valve, Y. The said valve is provided with ports A' B', which are arranged to come alternately in connection with the ports V W and the induction-port C', leading to the valve-chest, and the valve on opposite sides is provided with ports D' E', arranged to come alternately in connection with the eductionports F' G', as shown in Fig. 5 of the drawings. The valve is also provided with exhaust-ports H' I', which connect alternately with the reliefports K' L' in the valve-casing, for the purpose hereinafter described. The valve is also provided with a packing-piston, M', which works in a recess, N', in the valve-chest. The tappet-slide on top is provided with lugs P', between which sets the end of a lever, R', secured to the lower part of the valve.

The letter S' indicates a piston located and arranged to reciprocate in the cylinder above mentioned. The said piston is mounted on a piston-rod, T', which extends through stuffing-boxes at each end of the cylinder, the forward end of the piston-rod carrying the drillchuck U', which may be of the ordinary or any approved construction. The rear end of the piston-rod projects into a casing, V', which is bolted to the rear of the cylinder, so as to be rigidly secured to the same. The said rear end of the piston-rod is bored longitudinally, and at its extremity has secured within it a boss, W', which is provided with a screwthread of suitable pitch, as shown in Fig. 5 of the drawings. Through the said boss extends a screw, A³, threaded to fit the thread of the boss and provided at its rear end with a squared head, X', which sits in the squared opening of a ratchet, Y', arranged to rotate in a recess, Z', at the rear of the casing above mentioned. The said ratchet is confined by the back plate, A², secured to the rear of the casing, and its movement is checked in one direction by the pawls B², which, however, permit it to turn freely in the opposite direction. The rear end of the piston-rod on its outside has formed on it or securely fastened to it a pinion, C², which intermeshes with a long pinion, D², which has a bearing-boss, E², at its rear end journaled in a bearing at the rear of the casing, and at its forward end is recessed and adapted to rotate on an internally-threaded sleeve, F², as shown in Fig. 5 of the drawings. The forward end of said pinion D² is provided with a series of lugs, G², which are adapted to engage a similar series of lugs, H², on a sleeve, I², feathered and adapted to slide upon the sleeve F², so as to interlock the said sleeve H² with the long pinion, and cause the same to move together to automatically feed the drill. The opposite end of the sleeve I² is provided with recesses to engage the stationary lugs K² when desired to feed the drill by hand, as more fully hereinafter specified.

The letter L² indicates a threaded gland, having a flange, M², setting between the flanges at the opposite ends of the sleeve I², and arranged to work in a threaded aperture, K³, in the forward end of the casing, so as to shift the sleeve I² back and forth to permit the feed to be automatically effected or worked by hand. The feed-screw extends through the sleeve F² and a screw threaded opening in the forward part of the casing, and passes out at the rear of the casing through a suitable opening, L². From thence it extends backward to the rear of the machine, where it passes through a bearing, M², and is provided with a crank, N², as shown. On the rear end of said shaft is secured a ratchet-wheel, P², which is engaged by a pawl, R², which limits its motion in one direction, but permits it to travel in the opposite direction while feeding.

The operation of my invention will be readily understood in connection with the above description, and is as follows: The drill being properly placed in relation to the work to be done, and the drill-bit secured in the chuck at the forward end of the piston-rod, the induction port of the valve-chest is connected with a suitable steam-generator or air-pressure generator. Assuming the parts to be in the position shown in Fig. 5 of the drawings, the steam enters behind the piston and drives it forward, with the piston-rod carrying the drill to its work. At the end of its forward stroke it strikes the tappet-pin at that end of the cylinder, moving the tappet-slide and changing the ports of the oscillating valve, so as to admit steam or air in front of the piston and discharge it from behind. The piston-rod on its backward and forward thrust changes its position upon the screw A³, passing into its rear end, which causes its rotation in one direction to take place at a step-by-step movement, turning its pinion, rotating the long pinion, and causing the same to travel forward upon the feed screw, and thus carry the drill forward in the longitudinal ways in the bed. When it is desired to feed the drill by hand, the clutch sleeve is thrown forward, so as to engage the stationary lugs and free the lugs of the long pinion, thus allowing the screw to be worked by its crank to advance the cylinder and its attachments.

Having thus described my invention, what I claim, and desire to secure by Letters Patent, is—

1. The combination, with the piston-rod of the drill, and the pinion at its rear, of the long pinion, having a boss at its rear journaled in a suitable bearing, the rotating screw-sleeve, and feathered sleeve sliding thereon, and the interlocking lugs, whereby the feed devices may be automatically worked or worked by hand to advance the drill to its work, substantially as specified.

2. The combination, with the piston-rod bored longitudinally at its rear, of the screw-boss therein, the screw and controlling-ratchet and pawls at its rear end, and the long pinion and feed mechanism, substantially as specified.

In testimony whereof I affix my signature in presence of two witnesses.

JOHN B. MAAS.

Witnesses:
RUDOLPH J. MAAS,
WILLIAM J. MAAS.